United States Patent
Lapresti et al.

(10) Patent No.: US 11,685,054 B2
(45) Date of Patent: Jun. 27, 2023

(54) AUTONOMOUS PATH PLANNING AND PATH EXECUTION FOR DECONTAMINATION OF NUCLEAR POWER PLANT OBJECTS

(71) Applicant: Westinghouse Electric Company LLC, Cranberry Township, PA (US)

(72) Inventors: Michael A. Lapresti, Greensburgh, PA (US); Dane P. Brown, Jeannette, PA (US); W. Edward Bruce, IV, Pittsburgh, PA (US); Lyman J. Petrosky, Latrobe, PA (US); Nicholas N. Bhai, North Hutingtdon, PA (US); Joonwhee Park, Pittsburgh, PA (US); Murali Tejo Vijay Narasimhadevara, Pittsburgh, PA (US); Mark Schnepf, Pittsburgh, PA (US); Jared Glover, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 158 days.

(21) Appl. No.: 17/134,619

(22) Filed: Dec. 28, 2020

(65) Prior Publication Data
US 2022/0203552 A1    Jun. 30, 2022

(51) Int. Cl.
*B25J 11/00*    (2006.01)
*B25J 9/04*    (2006.01)
(Continued)

(52) U.S. Cl.
CPC .......... *B25J 11/0085* (2013.01); *B25J 9/042* (2013.01); *B25J 9/1664* (2013.01); *B25J 19/023* (2013.01); *G06T 17/00* (2013.01)

(58) Field of Classification Search
CPC ...... B25J 11/0085; B25J 9/042; B25J 9/1664; B25J 19/023; G06T 17/00; G21F 9/005; G21F 9/28
See application file for complete search history.

(56) References Cited

U.S. PATENT DOCUMENTS

| | | | |
|---|---|---|---|
| 2012/0107184 A1* | 5/2012 | Asiyanbola | A61L 2/24 422/291 |
| 2014/0144470 A1* | 5/2014 | Sewell | B65F 7/005 414/800 |

(Continued)

FOREIGN PATENT DOCUMENTS

| | | |
|---|---|---|
| CN | 104846425 A | 8/2015 |
| CN | 111774732 A | 10/2020 |

(Continued)

OTHER PUBLICATIONS

International Search Report and Written Opinion for International PCT Application No. PCT/US2021/073088, dated Apr. 14, 2022.
(Continued)

*Primary Examiner* — Kira Nguyen
(74) *Attorney, Agent, or Firm* — K&L Gates LLP (57) ABSTRACT

A method of decontaminating an object removed from a nuclear power plant utilizing a decontamination system is disclosed. The decontamination system includes a platform, an imaging system, a robotic arm including an end effector configured to discharge a decontamination medium, and a control system operably coupled to the imaging system and the robotic arm. The method includes placing the object on the platform, scanning, by the imaging system, the object, generating, by the control system, a three-dimensional model of the object based on the scanned object, planning, by the control system, a decontamination path based on the generated three-dimensional model, controlling, by the control system, a position of the robotic arm according to the (Continued)

planned decontamination path, and discharging, by the end effector, the decontamination medium onto the object at a plurality of positions along the planned decontamination path.

20 Claims, 4 Drawing Sheets

(51) Int. Cl.
  *B25J 9/16* (2006.01)
  *B25J 19/02* (2006.01)
  *G06T 17/00* (2006.01)

(56) References Cited

U.S. PATENT DOCUMENTS

| | | | | |
|---|---|---|---|---|
| 2014/0263221 | A1* | 9/2014 | Minehara | G21F 9/005 219/121.73 |
| 2016/0256924 | A1* | 9/2016 | Regusewicz | B22C 23/02 |
| 2016/0271803 | A1* | 9/2016 | Stewart | B25J 11/0085 |
| 2017/0246329 | A1* | 8/2017 | Lloyd | A61L 2/084 |
| 2018/0117194 | A1* | 5/2018 | Dobrinsky | G01N 21/6486 |
| 2019/0117812 | A1* | 4/2019 | Olsen | A61L 2/26 |
| 2021/0330844 | A1* | 10/2021 | Holden | A61L 2/26 |

FOREIGN PATENT DOCUMENTS

| | | |
|---|---|---|
| EP | 0681735 B1 | 4/1997 |
| EP | 2772922 A1 | 9/2014 |
| GB | 2383464 A | 12/2001 |

OTHER PUBLICATIONS

Petereit et al., Robdekon: Robotic Systems for Decontamination in Hazardous Environments, 2019 IEEE International Symposium on Safety, Security, and Rescue Robotics (SSRR), Wurzburg, Germany (Sep. 2-4, 2019), pp. 1-7.

Search Report for correspondence Taiwan Application No. 110148919, dated Nov. 23, 2022.

* cited by examiner

AUTONOMOUS PATH PLANNING AND PATH EXECUTION FOR DECONTAMINATION OF NUCLEAR POWER PLANT OBJECTS

BACKGROUND

This invention relates generally to decontamination systems for decontaminating objects, more specifically, for decontaminating components removed from decommissioned nuclear power plants.

SUMMARY

In various embodiments, a method of decontaminating an object removed from a nuclear power plant utilizing a decontamination system is disclosed. The decontamination system includes a platform, an imaging system, a robotic arm including an end effector configured to discharge a decontamination medium, and a control system operably coupled to the imaging system and the robotic arm. The method includes placing the object on the platform, scanning, by the imaging system, the object, generating, by the control system, a three-dimensional model of the object based on the scanned object, planning, by the control system, a decontamination path based on the generated three-dimensional model, controlling, by the control system, a position of the robotic arm according to the planned decontamination path, and discharging, by the end effector, the decontamination medium onto the object at a plurality of positions along the planned decontamination path.

In various embodiments, a decontamination system configured to decontaminate an object removed from a nuclear power plant is disclosed. The decontamination system includes a platform, an imaging system, a robotic arm including an end effector configured to discharge a decontamination medium, and a control system operably coupled to the imaging system and the robotic arm. The control system is configured to scan, by the imaging system, the object based on the object being positioned on the platform, generate, by the control system, a three-dimensional model of the object based on the scanned object, plan, by the control system, a decontamination path based on the generated three-dimensional model, control, by the control system, the robotic arm according to the planned decontamination path, and discharge, by the end effector, the decontamination medium onto the object at a plurality of positions along the planned decontamination path.

In various embodiments, a method of decontaminating an object removed from a nuclear power plant utilizing a decontamination system is disclosed. The decontamination system includes a platform, a motion generating system configured to rotate the platform, an imaging system, a robotic arm including an end effector configured to discharge a decontamination medium, and a control system operably coupled to the motor, the imaging system, and the robotic arm. the method includes placing the object on the platform, maintaining, by the control system, a position of the imaging system, rotating, by the motion generating system, the platform to a plurality of rotated positions relative to the imaging system, scanning, by the imaging system, the object at the plurality of rotated positions, generating, by the control system, a three-dimensional model of the object based on the scanned object, planning, by the control system, a decontamination path based on the generated three-dimensional model, controlling, by the control system, a position of the robotic arm according to the planned decontamination path, and discharging, by the end effector, the decontamination medium onto the object at a plurality of positions along the planned decontamination path.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Over the course of a nuclear power plant's lifespan, components utilized within the nuclear power plant can be exposed to radiation and therefore become contaminated. When the nuclear power plant is decommissioned, a decontamination operation is required in order to ensure that the components removed from the nuclear power plant are free, or at least substantially free, of radiation. Currently, this decontamination operation is performed manually in a wet decontamination box, which can be dirty, tiring, and more importantly, hazardous to the decontamination personnel owing to the radioactive dose absorbed by the personnel during the process.

In order to ease the work load and lower the radioactive dose absorbed by the workers, it would be desirable to automate the decontamination process. However, in order to effectively automate the process, the decontamination system must be capable of working closely with unknown parts from the nuclear power plant, such as valves, pumps, and the like, that do not have accompanying CAD models or drawings. Without accompanying CAD models or drawings, planning a decontamination path for the object would be extremely difficult.

It is therefore a goal of the present disclosure to provide an automated decontamination system that eliminates the unsafe working conditions for decontamination personnel and is capable of working with unknown parts from the nuclear power plant.

Figure 1:
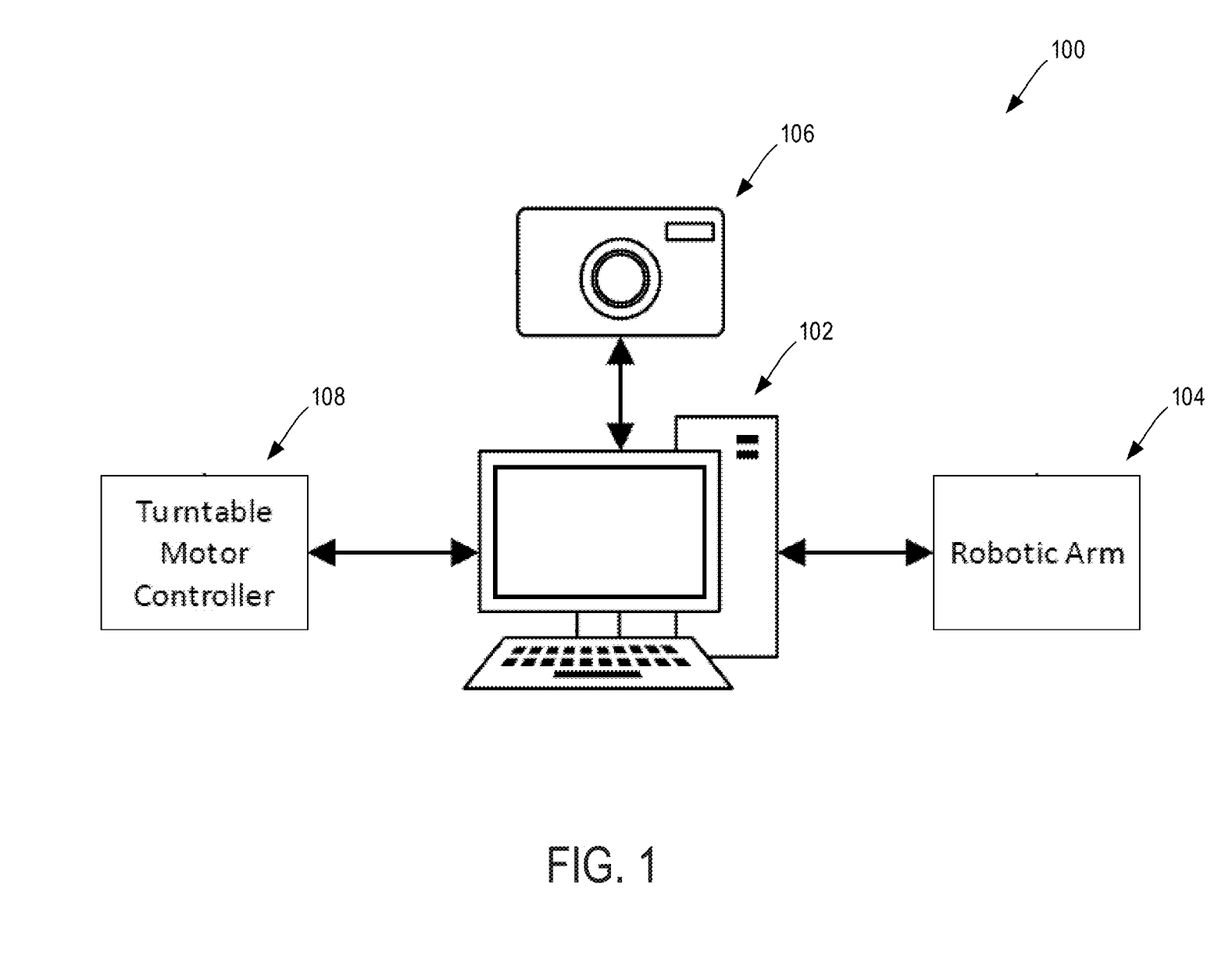
FIG. 1 illustrates a decontamination system, according to at least one aspect of the present disclosure.

Referring now to FIG. 1, a decontamination system 100 for decontaminating an object removed from a nuclear power plant is provided, according to at least one aspect of the present disclosure. The decontamination system 100 can include a control system 102, a robotic arm 104, an imaging system 106, and a turntable 108 including a platform. The control system 102 can be in operable communication with the robotic arm 104, the imaging system 106 and the turntable 108, as will be discussed in more detail below. In various embodiments, the control system 102 can include a processor and a memory operably coupled to the processor. The memory can include instructions that can be executable by the processor to carry out various functions of the decontamination process, such as controlling the robotic arm 104, the turntable 108, and the imaging system 106, among other functions, as is explained elsewhere herein.

The platform of the turntable 108 can be sized such that an object removed from the nuclear power plant can be placed thereon. The turntable 108 can include a motion generator, such as a motor, coupled to the platform such that the platform can be rotatable relative to the control system 102. In one aspect, the motion generator can be in operable communication with the control system 102 such that the control system 102 can control the rotation of the platform, and therefore, can control the rotational position of the object positioned on the platform. In various embodiments, the control system 102 can rotate the platform at a uniform, constant speed. In various embodiments, the control system 102 can rotate the platform at a variety of speeds. In various embodiments, the control system 102 can rotate the platform to a plurality of discrete, rotated positions relative to the imaging system 106 such that the imaging system 106 can scan the object at the plurality of rotated positions, as will be discussed in more detail below. In various embodiments, the control system 102 can control the platform such that the platform remains stationary (i.e., does not rotate) during the scanning process of the object.

In various embodiments, the robotic arm 104 can include an end effector. The end effector can be coupled to a decontamination medium source such that the end effector is capable of discharging a decontamination medium therefrom. In various embodiments, the end effector can be similar to a hose or a nozzle such that the end effector can discharge or spray a decontamination medium onto an object that is intended to be decontaminated. In various embodiments, the decontamination medium could include water that can be discharged at a high pressure. In various embodiments, the decontamination medium could include sand that can be discharged at a high pressure. In various embodiments, the decontamination medium could include a laser to allow for laser ablation of the object.

In various embodiments, the decontamination system 100 can further include a treatment system. The treatment system can include a collection system, such as a drain, a pump, a sink, as examples, that can collect the decontamination medium discharged from the end effector onto the object. In one aspect, the collection system could be placed on the floor, similar to that of a sump pump, such that, after the decontamination medium is sprayed onto the object, the decontamination medium would fall and arrive at the collection system. In various other embodiments, the collection system could include a vacuum that can be controlled by the control system 102 to vacuum up and collect the spent decontamination medium.

In various embodiments, the treatment system can further include a cleaning system coupled to the collection system. The cleaning system can clean the decontamination medium collected by the collection system, such as by purifying the medium, filtering the medium, sterilizing the medium, as examples. The cleaning system can be in operable connection with the decontamination medium source such that the cleaned decontamination medium can be utilized again in a decontamination process.

In various embodiments, the imaging system 106 can be any suitable three-dimensional (3D) imaging, detector, or visualization system that can scan the object positioned on the platform in real-time and provide the scanned images to the control system 102. In one aspect, the control system 102 can control a position of the imaging system 106 such that the imaging system 106 is able to sufficiently scan the object positioned on the platform and the control system 102 can generate a 3D model of the object with the scanned images, as will be discussed in more detail below. In various embodiments, the imaging system 106 can be mounted to a robotic arm and the control system 102 can move the robotic arm to a plurality of scanning positions relative to the object. In various other embodiments, the robotic arm that the imaging system 106 is mounted to can be different than the robotic arm 104 such that the decontamination system 100 includes two robotic arms. In various other embodiments, the imaging system 106 can be mounted to the robotic arm 104. In various embodiments, the imaging system 106 can be mounted in any suitable way, such as on a robotic arm 104 or elsewhere, such that the imaging system 106 can be held stationary during the scanning process. In embodiments where the imaging system 106 remains stationary, the control system 102 can rotate the platform to a plurality of rotated positions relative to the imaging system 106, as referenced above, such that the stationary visualization system 106 is capable of scanning multiple angles of the object. Various embodiments are envisioned where the imaging system 106 is moved to a plurality of scanning positions and the platform is also rotated to a plurality of rotated positions.

In various embodiments, the control system 102 can utilize the scanned images from the imaging system 106 to create a 3D model, such as a CAD model, of the object positioned on the platform. In some embodiments, the control system 102 can generate the 3D model of the object as the imaging system 106 is scanning the object. In some embodiments, the control system 102 can generate the 3D model of the object once the imaging system 106 has finalized scanning the object. In various embodiments, if the control system 102 is unable to sufficiently complete the 3D model with the scanned images provided by the imaging system 106, such as if some of the images are blurry, the control system 102 can control the imaging system 106 to re-scan the object at the incomplete positions so as to arrive at a complete 3D model of the object. In various other embodiments, a user can manually control the control system 102 such that the user can position the imaging system 106 relative to the object to ensure that sufficient images are captured to ensure that a complete 3D model can be generated. In various embodiments, the control system 102 can be similar to the client described in U.S. Pat. No. 10,600,203, which is hereby incorporated by reference in its entirety herein.

In one aspect, once a 3D model of the object has been generated, the control system 102 can plan a decontamination path based on the generated 3D model of the object. The decontamination path can include a path that is intended to be traversed by the end effector relative to the object during the decontamination process. In various embodiments, the decontamination path can include moving the end effector to a plurality of discrete positions relative to the object. The plurality of positions can include any number of positions so as the end effector can sufficiently decontaminate the object, as will be described in more detail below. In various embodiments, the planned decontamination path can include a variety of constraints to aid in cleaning of the object. As an example, a constraint can include positioning the end effector a predetermined distance, or within a predetermined range of distances, away from the object at the plurality of positions along the decontamination path. Another example constraint can include a minimum number of positons needed to sufficiently decontaminate the object along the decontamination path. Another example constraint can include a minimum or maximum distance between the plurality of positions along the decontamination path. Various other constraints are envisioned to assist in sufficiently decontaminating the object.

Once a decontamination path has been planned by the control system 102, the control system 102 can execute the planned decontamination path to control the robotic arm 104 and position the end effector relative to the object according to the decontamination path. In one aspect, the control system 102 can position the end effector at a plurality of discrete positions along the decontamination path and then the end effector can discharge the decontamination medium so as the end effector only discharges decontamination medium at the discrete positions of the decontamination path. In other embodiments, the control system 102 can move the end effector along the decontamination path and the end effector can continuously discharge the decontamination medium as the end effector moves along the decontamination path. In various embodiments, the control system 102 can position the end effector relative to the object along the decontamination path while also controlling the turntable 108 to rotate the object. In one aspect, the control system 102 can control the turntable 108 to rotate while maintaining the robotic arm 104 stationary. Any combination of movement between the robotic arm 104 and the turntable 108 are envisioned such that the end effector can move along the planned decontamination path to decontaminate the object.

Once the object has been decontaminated according to the planned decontamination path, in various embodiments, the decontamination system 100 can further include a sensor assembly that can be utilized to sense a level of radiation emitting from the object. In one aspect, if the radiation levels are below a predetermined threshold, the object can be removed from the platform and can be removed from the nuclear power plant. In one aspect, if the radiation levels are at or above a predetermined threshold, the control system 102 can determine that the object is not sufficiently decontaminated at that further decontamination is required. In such a scenario, as an example, the control system 102 can control the robotic arm 104 to execute the planned decontamination path of the end effector again to further decontaminate the object until the sensed radiation is below the predetermined threshold required. In various embodiments, if the radiation levels are at or above a predetermined threshold, the control system 102 could restart the process over again, beginning with scanning the object to create a new 3D model.

Figure 2:
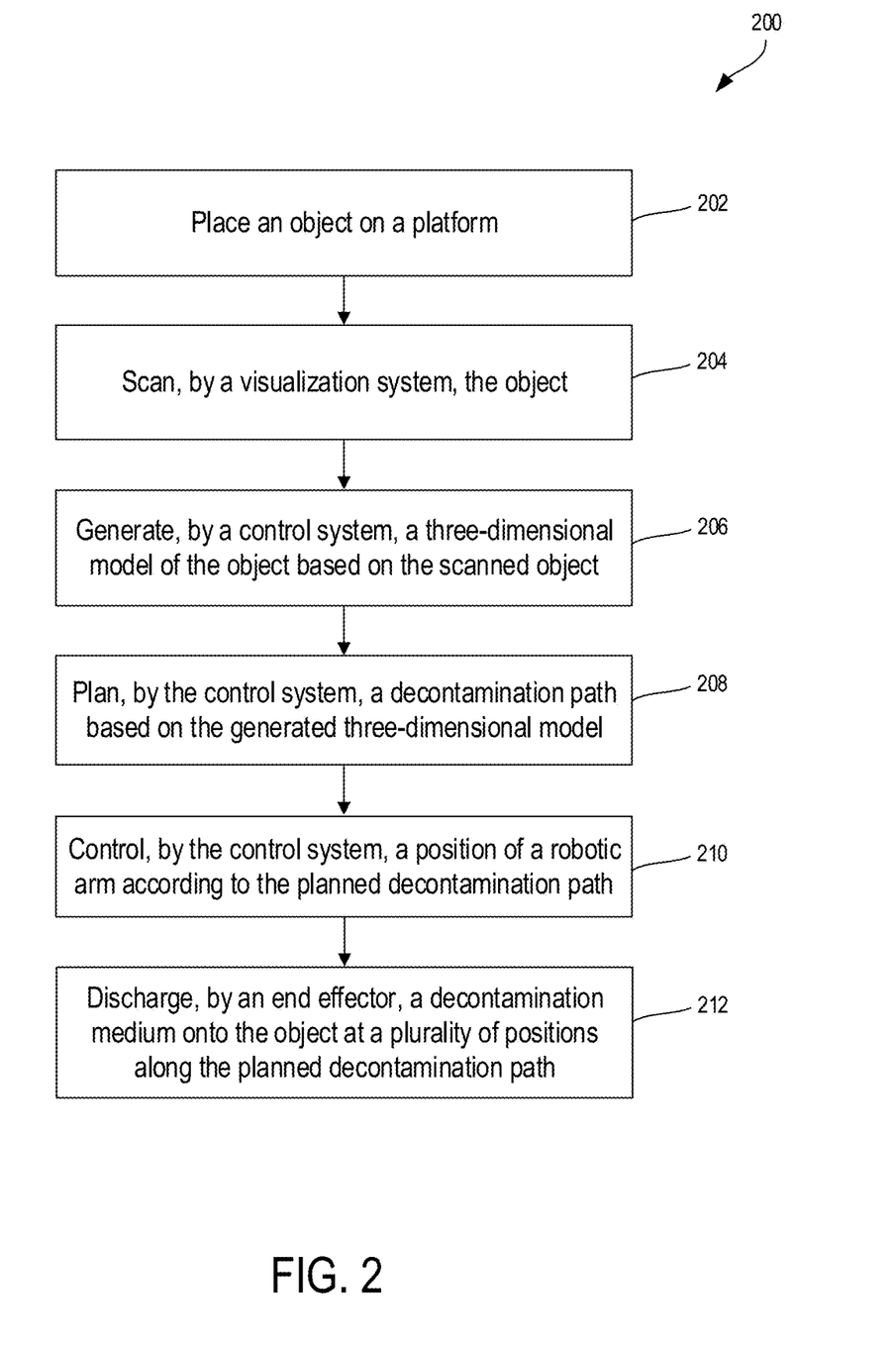
FIG. 2 illustrates a method of decontaminating an object removed from a nuclear power plant utilizing a decontamination system, according to at least one aspect of the present disclosure.

Referring now to FIG. 2, a method 200 of decontaminating an object removed from a nuclear power plant utilizing a decontamination system is provided, according to at least one aspect of the present disclosure. In various embodiments, the decontamination system can be similar to decontamination system 100. In various embodiments, the decontamination system can include a platform, an imaging system, a robotic arm including an end effector configured to discharge a decontamination medium, and a control system operably coupled to the imaging system and the robotic arm.

In one aspect, the method 200 can include placing 202 an object on the platform, scanning 204, by the imaging system, the object, generating 206, by the control system, a three-dimensional model of the object based on the scanned object, planning 208, by the control system, a decontamination path based on the generated three-dimensional model, controlling 210, by the control system, a position of the robotic arm according to the planned decontamination path, and discharging 212, by the end effector, the decontamination medium onto the object at a plurality of positions along the planned decontamination path.

Figure 3:
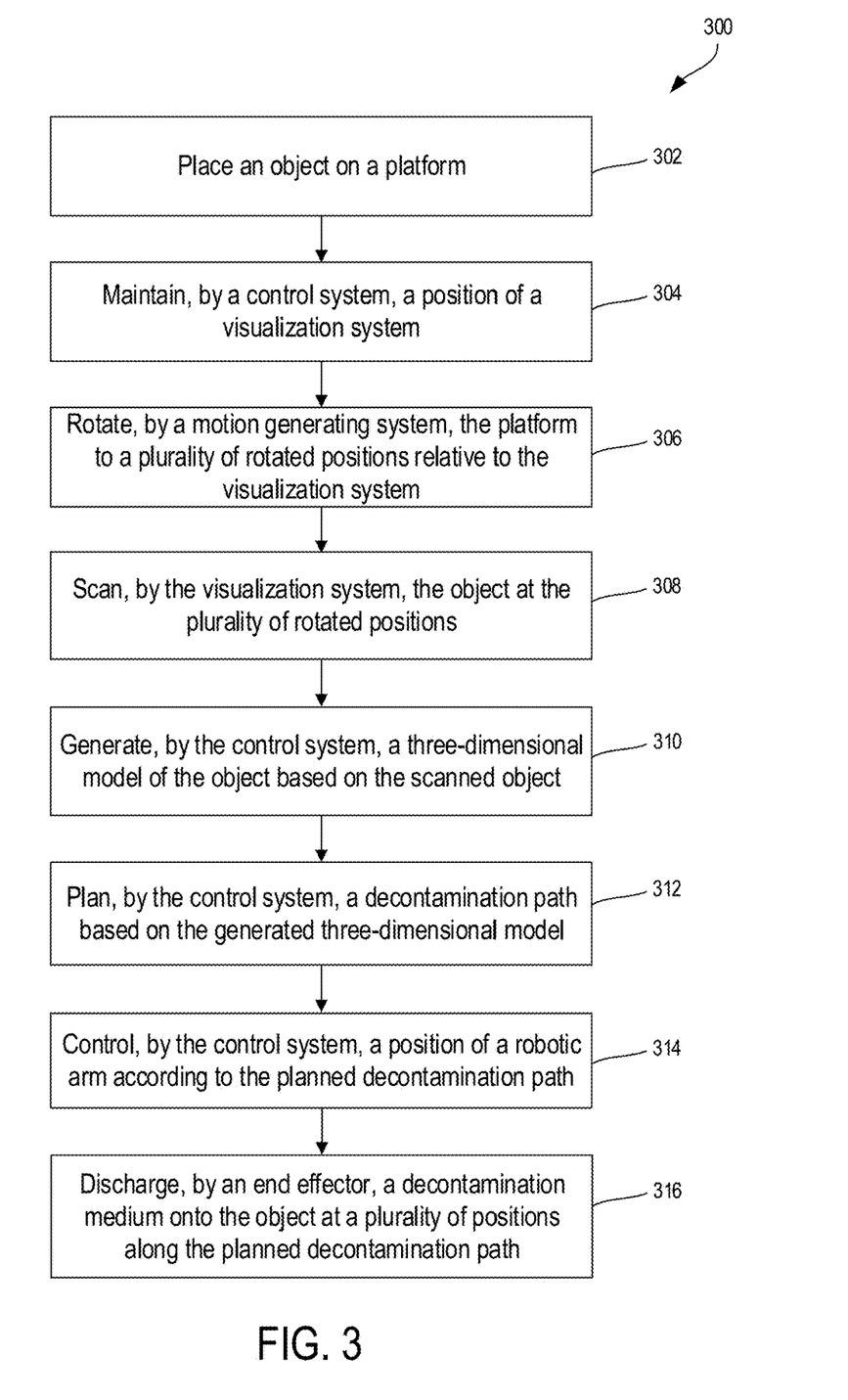
FIG. 3 illustrates a method of decontaminating an object removed from a nuclear power plant utilizing a decontamination system, according to at least one aspect of the present disclosure.

Referring now to FIG. 3, a method 300 of decontaminating an object removed from a nuclear power plant utilizing a decontamination system is provided, according to at least one aspect of the present disclosure. In various embodiments, the decontamination system can be similar to decontamination system 100. In various embodiments, the decontamination system can include a platform, a motor configured to rotate the platform, an imaging system, a robotic arm including an end effector configured to discharge a decontamination medium, and a control system operably coupled to the motor, the imaging system, and the robotic arm.

In one aspect, the method 300 can include placing 302 an object on the platform, maintaining 304, by the control system, a position of the imaging system, rotating 306, by the motion generating system, the platform to a plurality of rotated positions relative to the imaging system, scanning 308, by the imaging system, the object at the plurality of rotated positions, generating 310, by the control system, a three-dimensional model of the object based on the scanned object, planning 312, by the control system, a decontamination path based on the generated three-dimensional model, controlling 314, by the control system, a position of the robotic arm according to the planned decontamination path, and discharging 316, by the end effector, the decontamination medium onto the object at a plurality of positions along the planned decontamination path.

Figure 4:
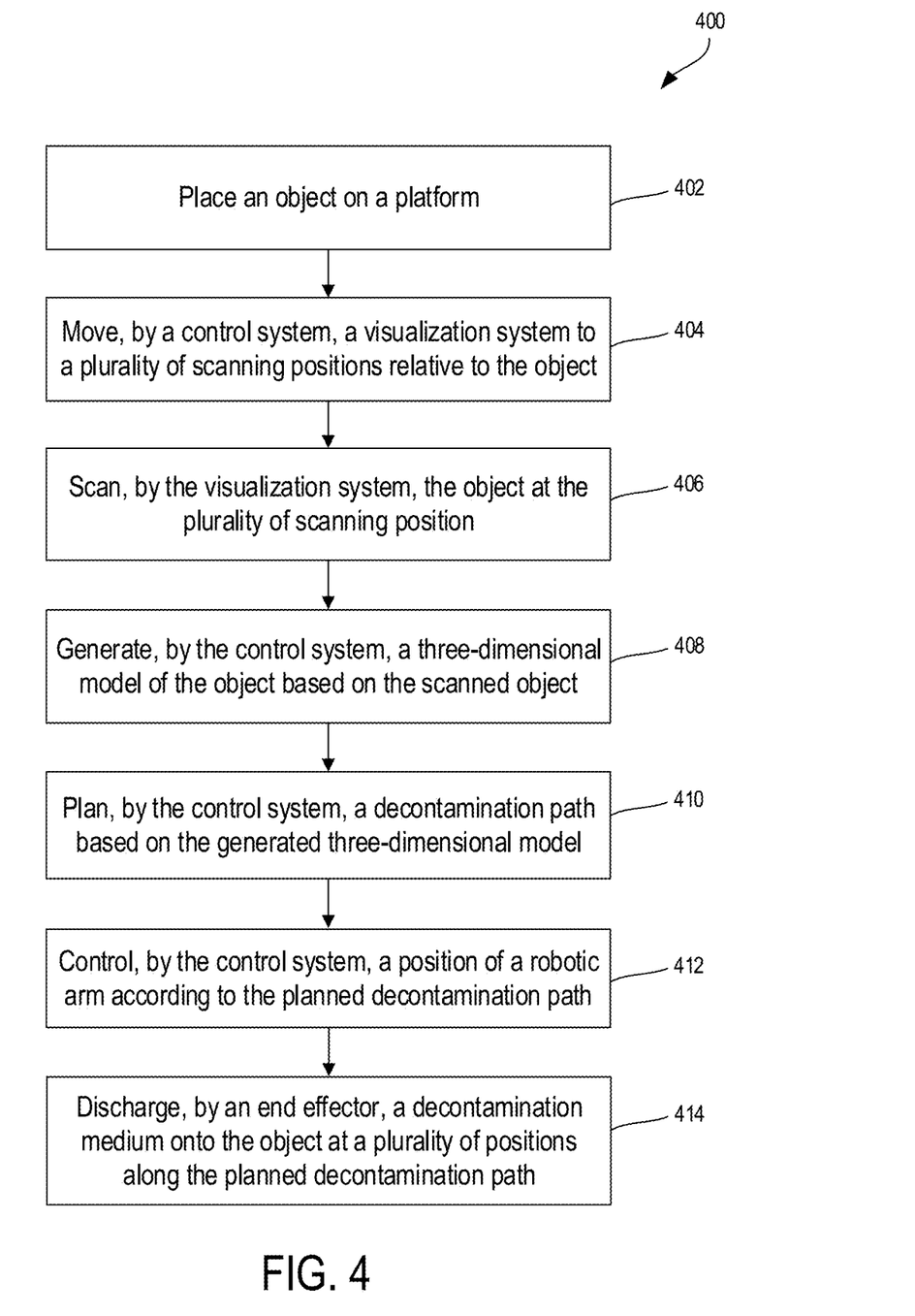
FIG. 4 illustrates a method of decontaminating an object removed from a nuclear power plant utilizing a decontamination system, according to at least one aspect of the present disclosure.

Referring now to FIG. 4, a method 400 of decontaminating an object removed from a nuclear power plant utilizing a decontamination system is provided, according to at least one aspect of the present disclosure. In various embodiments, the decontamination system can be similar to decontamination system 100. In various embodiments, the decontamination system can include a platform, an imaging system, a robotic arm including an end effector configured to discharge a decontamination medium, and a control system operably coupled to the motor, the imaging system, and the robotic arm.

In one aspect, the method 400 can include placing 402 an object on the platform, moving 404, by the control system, the imaging system to a plurality of scanning positions relative to the object, scanning 406, by the imaging system, the object at the plurality of scanning position, generating 408, by the control system, a three-dimensional model of the object based on the scanned object, planning 410, by the control system, a decontamination path based on the generated three-dimensional model, controlling 412, by the control system, a position of the robotic arm according to the planned decontamination path, and discharging 414, by the end effector, the decontamination medium onto the object at a plurality of positions along the planned decontamination path.

Various aspects of the subject matter described herein are set out in the following examples.

Example 1

A method of decontaminating an object removed from a nuclear power plant utilizing a decontamination system, wherein the decontamination system comprises a platform, an imaging system, a robotic arm comprising an end effector configured to discharge a decontamination medium, and a control system operably coupled to the imaging system and the robotic arm, the method comprising placing the object on the platform, scanning, by the imaging system, the object, generating, by the control system, a three-dimensional model of the object based on the scanned object, planning, by the control system, a decontamination path based on the generated three-dimensional model, controlling, by the control system, a position of the robotic arm according to the planned decontamination path, and discharging, by the end effector, the decontamination medium onto the object at a plurality of positions along the planned decontamination path.

Example 2

The method of Example 1, wherein the decontamination system further comprises a motion generating system operably coupled to the platform and the control system, wherein the motion generating system is configured to rotate the platform, and wherein the method further comprises maintaining, by the control system, a position of the imaging system, rotating, by the motion generating system, the platform to a plurality of rotated positions relative to the imaging system, and scanning, by the imaging system, the object at the plurality of rotated positions.

Example 3

The method of Example 1, further comprising moving, by the control system, the imaging system to a plurality of scanning positions relative to the object and scanning, by the imaging system, the object at the plurality of scanning positions.

Example 4

The method of any one of Examples 1-3, wherein the imaging system is mounted to the robotic arm.

Example 5

The method of any one of Examples 1-4, wherein the decontamination system further comprises a treatment system, and wherein the method further comprises collecting, by the treatment system, the decontamination medium discharged onto the object and cleaning, by the treatment system, the collected decontamination medium.

Example 6

The method of any one of Examples 1-5, wherein the method further comprises positioning the end effector a predefined distance away from the object at the plurality of positions along the planned decontamination path.

Example 7

The method of any one of Examples 1-6, wherein the decontamination medium comprises high pressure water.

Example 8

The method of any one of Examples 1-6, wherein the decontamination medium comprises sand.

Example 9

A decontamination system configured to decontaminate an object removed from a nuclear power plant, the decontamination system comprising a platform, an imaging system, a robotic arm comprising an end effector configured to discharge a decontamination medium and a control system operably coupled to the imaging system and the robotic arm, wherein the control system is configured to scan, by the imaging system, the object based on the object being positioned on the platform, generate, by the control system, a three-dimensional model of the object based on the scanned object, plan, by the control system, a decontamination path based on the generated three-dimensional model, control, by the control system, the robotic arm according to the planned decontamination path, and discharge, by the end effector, the decontamination medium onto the object at a plurality of positions along the planned decontamination path.

Example 10

The decontamination system of Example 9, further comprising a motion generating system operably coupled to the platform and the control system, wherein the motion generating system is configured to rotate the platform.

Example 11

The decontamination system of Example 10, wherein the control system is further configured to maintain, by the control system, a position of the imaging system, rotate, by the motion generating system, the platform to a plurality of rotated positions relative to the imaging system, and scan, by the imaging system, the object at the plurality of rotated positions.

Example 12

The decontamination system of Example 9, wherein the control system is configured to move, by the control system, the imaging system to a plurality of scanning positions relative to the object and scan, by the imaging system, the object at the plurality of scanning positions.

Example 13

The decontamination system of any one of Examples 9-12, wherein the imaging system is mounted to the robotic arm.

Example 14

The decontamination system of any one of Examples 9-13, further comprising a treatment system configured to collect the decontamination medium discharged onto the object and clean the collected decontamination medium.

Example 15

The decontamination system of any one of Examples 9-14, wherein the control system is further configured to position the end effector a predefined distance away from the object at the plurality of positions along the planned decontamination path.

Example 16

The decontamination system of any one of Examples 9-15, wherein the decontamination medium comprises high pressure water.

Example 17

The decontamination system of any one of Examples 9-15, wherein the decontamination medium comprises sand.

Example 18

A method of decontaminating an object removed from a nuclear power plant utilizing a decontamination system, wherein the decontamination system comprises a platform, a motion generating system configured to rotate the platform, an imaging system, a robotic arm comprising an end effector configured to discharge a decontamination medium, and a control system operably coupled to the motor, the imaging system, and the robotic arm, the method comprising placing the object on the platform, maintaining, by the control system, a position of the imaging system, rotating, by the motion generating system, the platform to a plurality of rotated positions relative to the imaging system, scanning, by the imaging system, the object at the plurality of rotated positions, generating, by the control system, a three-dimensional model of the object based on the scanned object, planning, by the control system, a decontamination path based on the generated three-dimensional model, controlling, by the control system, a position of the robotic arm according to the planned decontamination path, and discharging, by the end effector, the decontamination medium onto the object at a plurality of positions along the planned decontamination path.

Example 19

The method of Example 18, wherein the decontamination system further comprises a treatment system, and wherein the method further comprises collecting, by the treatment system, the decontamination medium discharged onto the object and cleaning, by the treatment system, the collected decontamination medium.

Example 20

The method of Examples 18 or 19, wherein the imaging system is mounted to the robotic arm.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of decontaminating an object removed from a nuclear power plant utilizing a decontamination system, wherein the decontamination system comprises a platform, an imaging system, a robotic arm comprising an end effector configured to discharge a decontamination medium, and a control system operably coupled to the imaging system and the robotic arm, the method comprising:
   placing the object on the platform;
   scanning, by the imaging system, the object;
   generating, by the control system, a three-dimensional model of the object based on the scanned object;
   planning, by the control system, a decontamination path based on the generated three-dimensional model;
   controlling, by the control system, a position of the robotic arm according to the planned decontamination path; and
   discharging, by the end effector, the decontamination medium onto the object at a plurality of positions along the planned decontamination path.

2. The method of claim 1, wherein the decontamination system further comprises a motion generating system operably coupled to the platform and the control system, wherein the motion generating system is configured to rotate the platform, and wherein the method further comprises:
   maintaining, by the control system, a position of the imaging system;
   rotating, by the motion generating system, the platform to a plurality of rotated positions relative to the imaging system; and
   scanning, by the imaging system, the object at the plurality of rotated positions.

3. The method of claim 1, further comprising:
   moving, by the control system, the imaging system to a plurality of scanning positions relative to the object; and
   scanning, by the imaging system, the object at the plurality of scanning positions.

4. The method of claim 1, wherein the imaging system is mounted to the robotic arm.

5. The method of claim 1, wherein the decontamination system further comprises a treatment system, and wherein the method further comprises:
   collecting, by the treatment system, the decontamination medium discharged onto the object; and
   cleaning, by the treatment system, the collected decontamination medium.

6. The method of claim 1, wherein the method further comprises positioning the end effector a predefined distance away from the object at the plurality of positions along the planned decontamination path.

7. The method of claim 1, wherein the decontamination medium comprises high pressure water.

8. The method of claim 1, wherein the decontamination medium comprises sand.

9. A decontamination system configured to decontaminate an object removed from a nuclear power plant, the decontamination system comprising:
- a platform;
- an imaging system;
- a robotic arm comprising an end effector configured to discharge a decontamination medium; and
- a control system operably coupled to the imaging system and the robotic arm, wherein the control system is configured to:
  - scan, by the imaging system, the object based on the object being positioned on the platform;
  - generate, by the control system, a three-dimensional model of the object based on the scanned object;
  - plan, by the control system, a decontamination path based on the generated three-dimensional model;
  - control, by the control system, the robotic arm according to the planned decontamination path; and
  - discharge, by the end effector, the decontamination medium onto the object at a plurality of positions along the planned decontamination path.

10. The decontamination system of claim 9, further comprising a motion generating system operably coupled to the platform and the control system, wherein the motion generating system is configured to rotate the platform.

11. The decontamination system of claim 10, wherein the control system is further configured to:
- maintain, by the control system, a position of the imaging system;
- rotate, by the motion generating system, the platform to a plurality of rotated positions relative to the imaging system; and
- scan, by the imaging system, the object at the plurality of rotated positions.

12. The decontamination system of claim 9, wherein the control system is configured to:
- move, by the control system, the imaging system to a plurality of scanning positions relative to the object; and
- scan, by the imaging system, the object at the plurality of scanning positions.

13. The decontamination system of claim 9, wherein the imaging system is mounted to the robotic arm.

14. The decontamination system of claim 9, further comprising a treatment system configured to:
- collect the decontamination medium discharged onto the object; and
- clean the collected decontamination medium.

15. The decontamination system of claim 9, wherein the control system is further configured to position the end effector a predefined distance away from the object at the plurality of positions along the planned decontamination path.

16. The decontamination system of claim 9, wherein the decontamination medium comprises high pressure water.

17. The decontamination system of claim 9, wherein the decontamination medium comprises sand.

18. A method of decontaminating an object removed from a nuclear power plant utilizing a decontamination system, wherein the decontamination system comprises a platform, a motion generating system configured to rotate the platform, an imaging system, a robotic arm comprising an end effector configured to discharge a decontamination medium, and a control system operably coupled to the motor, the imaging system, and the robotic arm, the method comprising:
- placing the object on the platform;
- maintaining, by the control system, a position of the imaging system;
- rotating, by the motion generating system, the platform to a plurality of rotated positions relative to the imaging system;
- scanning, by the imaging system, the object at the plurality of rotated positions;
- generating, by the control system, a three-dimensional model of the object based on the scanned object;
- planning, by the control system, a decontamination path based on the generated three-dimensional model;
- controlling, by the control system, a position of the robotic arm according to the planned decontamination path; and
- discharging, by the end effector, the decontamination medium onto the object at a plurality of positions along the planned decontamination path.

19. The method of claim 18, wherein the decontamination system further comprises a treatment system, and wherein the method further comprises:
- collecting, by the treatment system, the decontamination medium discharged onto the object; and
- cleaning, by the treatment system, the collected decontamination medium.

20. The method of claim 18, wherein the imaging system is mounted to the robotic arm.

* * * * *